United States Patent [19]

Badesha et al.

[11] Patent Number: 5,741,841
[45] Date of Patent: Apr. 21, 1998

[54] COATING COMPOSITION WITH STABLE VISCOSITY

[75] Inventors: Santokh S. Badesha, Pittsford; George J. Heeks, Rochester; Arnold W. Henry, Pittsford, all of N.Y.; Biritawit Asfaw, Oakville, Canada; Marko D. Saban, Etobicoke, Canada; John Abate, Mississauga, Canada; Richard L. Carlston, Rochester, N.Y.; Nam S. Ro, Mississauga, Canada

[73] Assignee: Xerox Corporation, Stamford, Conn.

[21] Appl. No.: 637,912

[22] Filed: Apr. 25, 1996

[51] Int. Cl.$^6$ .................................................. C08C 53/04
[52] U.S. Cl. ............................ 524/379; 524/506; 525/104
[58] Field of Search ........................... 525/104, 288; 524/506, 375

[56] References Cited

U.S. PATENT DOCUMENTS

| 4,029,827 | 6/1977 | Imperial et al. | 427/22 |
| 4,101,686 | 7/1978 | Strella et al. | 427/22 |
| 4,257,699 | 3/1981 | Lentz | 355/3 FU |
| 4,264,181 | 4/1981 | Lentz et al. | 355/3 FU |
| 4,272,179 | 6/1981 | Seanor | 355/3 FU |
| 4,593,068 | 6/1986 | Hirose | 525/100 |
| 5,141,788 | 8/1992 | Badesha et al. | 428/36.8 |
| 5,166,031 | 11/1992 | Badesha et al. | 430/124 |
| 5,340,679 | 8/1994 | Badesha et al. | 430/126 |
| 5,371,150 | 12/1994 | Osawa et al. | 525/326.3 |
| 5,395,725 | 3/1995 | Bluett et al. | 430/124 |
| 5,480,938 | 1/1996 | Badesha et al. | 525/104 |
| 5,501,881 | 3/1996 | Fuller | 427/421 |

*Primary Examiner*—Ralph H. Dean
*Attorney, Agent, or Firm*—Zosan S. Soong

[57] ABSTRACT

There is disclosed a coating composition including water, a solvent, a grafted elastomer composed of a polyorganosiloxane bonded to a fluoroelastomer, and a liquid which forms an azeotropic mixture with the water, wherein the azeotropic mixture of the water and the liquid restrains a viscosity increase in the coating composition over time.

12 Claims, 1 Drawing Sheet

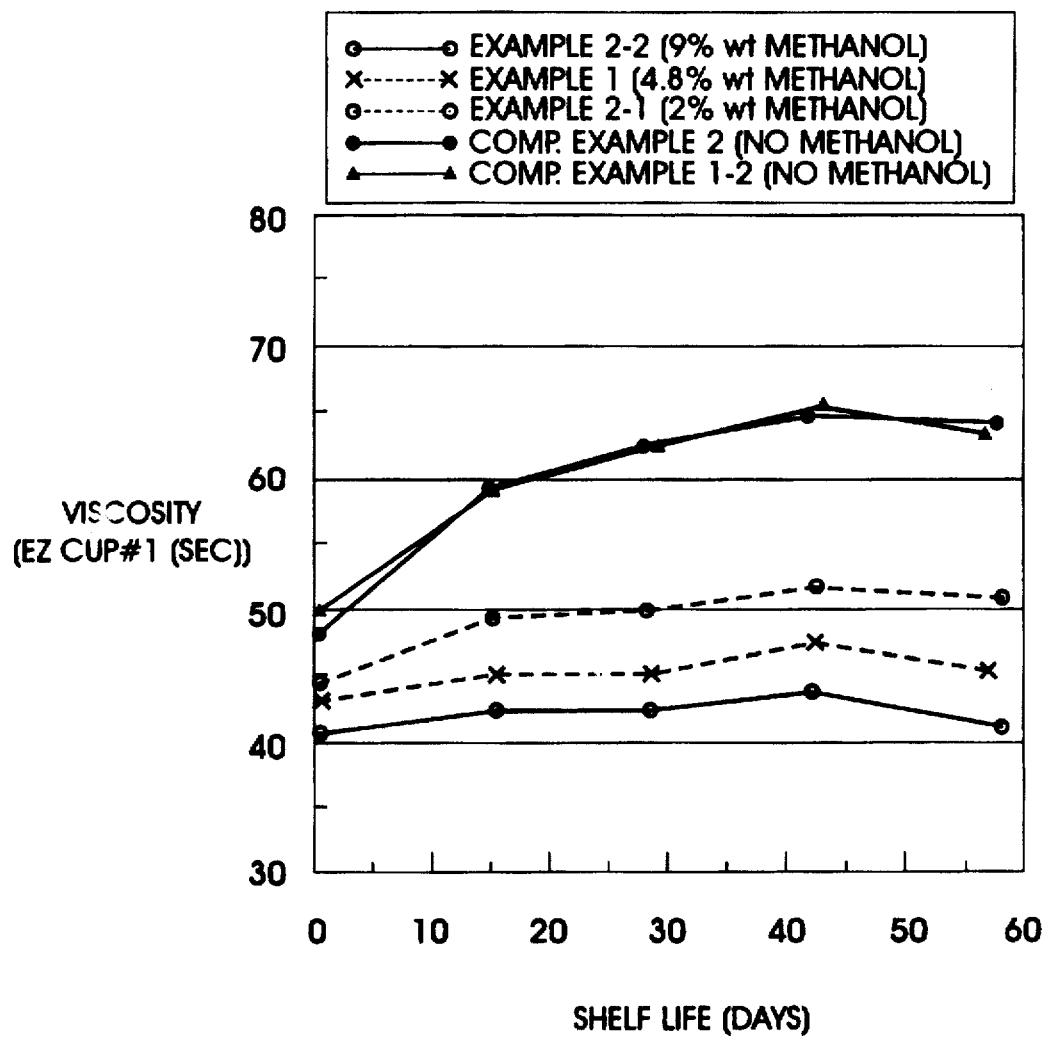

5,741,841

1

COATING COMPOSITION WITH STABLE VISCOSITY

BACKGROUND OF THE INVENTION

This invention relates generally to a coating composition and more particularly to a coating composition exhibiting a relatively stable viscosity by including a liquid that forms an azeotropic mixture with water, wherein the water may be present in the form of moisture.

It has been observed that the standard coating composition containing the volume grafted, elastomer, described in Badesha et al., U.S. Pat. No. 5,166,031, the disclosure of which is totally incorporated by reference, exhibits increasing viscosity over time which at some point renders the coating composition unsuitable for easy application to a substrate such as by spray coating. This standard coating composition is used in preparing the outer layer of a fuser subsystem component. Thus, there is a need, which the present invention addresses, for a new coating composition containing the volume grafted elastomer which exhibits a stable viscosity over time, thereby increasing the pot life.

Attention is directed to the following documents:

Timothy J. Fuller et al., U.S. Ser. No. 08/347,667, filed Dec. 1, 1994 now U.S. Pat. No. 5,501,881 titled "Coated Fuser Member Processes," discloses a process for preparing a fuser member involving applying to a fuser supporting substrate a coating mixture of a fluoropolymer, and an aliphatic alcohol, wherein the presence of the aliphatic alcohol increases the pot life of the coating mixture;

Seanor, U.S. Pat. No. 4,272,179 was relied upon by the Examiner in an obviousness rejection in the above discussed Fuller et al., U.S. Ser. No. 08/347,667; now U.S. Pat. No. 5,501,881

Bluett et al., U.S. Pat. No. 5,395,725;

Imperial et al., U.S. Pat. No. 4,029,827;

Strella et al., U.S. Pat. No. 4,101,686;

Lentz, U.S. Pat. No. 4,257,699; and

Lentz et al., U.S. Pat. No. 4,264,181.

SUMMARY OF THE INVENTION

The present invention is accomplished in embodiments by providing a coating composition comprising water (for example in trace amounts), a solvent, a grafted elastomer composed of a polyorganosiloxane bonded to a fluoroelastomer, and a liquid which forms an azeotropic mixture with the water, wherein the azeotropic mixture of the water and the liquid restrains a viscosity increase in the coating composition over time.

There is also provided in embodiments a method comprising including in a water containing coating composition a liquid which forms an azeotropic mixture with the water, thereby restraining a viscosity increase in the composition over time, wherein the coating composition comprises the azeotropic mixture of the liquid and the water, a solvent, and a grafted elastomer composed of a polyorganosiloxane bonded to a fluoroelastomer.

BRIEF DESCRIPTION OF THE DRAWINGS

Other aspects of the present invention will become apparent as the following description proceeds and upon reference to FIG. 1 which depicts the effect of methanol concentration on the shelf life of a solution containing a polyorganosiloxane grafted to a fluoroelastomer.

2

DETAILED DESCRIPTION

By the phrase volume graft or volume grafted elastomer, it is intended to define a substantially uniform integral interpenetrating network of a hybrid composition, wherein both the structure and the composition of the fluoroelastomer and polyorganosiloxane are substantially uniform when taken through different slices of the fuser subsystem component.

The phrase interpenetrating network is intended to define the addition polymerization matrix where the fluoroelastomer and polyorganosiloxane polymer strands are intertwined in one another.

The term hybrid composition is intended to define a volume grafted composition which is comprised of fluoroelastomer and polyorganosiloxane blocks randomly arranged.

The present coating composition may be used for example in the preparation of the outer layer of a fuser subsystem component, preferably the fuser member. The present coating composition may be applied to a substrate by spray coating, flow coating, and the like. The fuser subsystem component may be a roll, belt, flat surface or other suitable shape used in the fixing of thermoplastic toner images to a suitable substrate. It may take the form of a fuser member, a pressure member or a release agent donor member, preferably in the form of a cylindrical roll. Typically, the fuser subsystem component is made of a hollow cylindrical metal core, such as copper, aluminum, steel and the like, and has an outer layer of the selected cured elastomer. Alternatively, there may be one or more intermediate layers between the substrate and the outer layer of the cured elastomer if desired. The fuser subsystem component is primarily discussed in the context of a fuser member, but the present invention is applicable to fabrication of the pressure member and the release agent donor member.

The volume grafting according to the present invention is performed in two steps, the first involves the dehydrofluorination of the fluoroelastomer preferably using an amine. During this step hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer.

Fluoroelastomer examples include those described in detail in Lentz, U.S. Pat. No. 4,257,699, as well as those described in Eddy et al., U.S. Pat. No. 5,017,432 and Ferguson et al., U.S. Pat. No. 5,061,965, the disclosures of which are totally incorporated by reference. As described therein these fluoroelastomers, particularly from the class of copolymers and terpolymers of vinylidenefluoride hexafluoropropylene and tetrafluoroethylene, are known commercially under various designations as VITON A™, VITON E™, VITON E60C™, VITON E430™, VITON 910™, VITON GH™ and VITON GF™. The VITON™ designation is a Trademark of E.I. Dupont deNemours, Inc. Other commercially available materials include FLUOREL 2170™, FLUOREL 2174™, FLUOREL 2176™, FLUOREL 2177™ and FLUOREL LVS 76™, FLUOREL™ being a Trademark of 3M Company. Additional commercially available materials include AFLAS™ a poly(propylene-tetrafluoroethylene), FLUOREL II™ (LII900) a poly (propylene-tetrafluoroethylene-vinylidenefluoride) both also available from 3M Company as well as the TECNOFLON™ compositions identified as FOR-60KIR, FOR-LHF, NM, FOR-THF, FOR-TFS, TH, TN505 available from Montedison Specialty Chemical Co. Typically, these fluoroelastomers are cured with a nucleophilic addition curing system, such as a bisphenol crosslinking agent with an organophosphonium salt accelerator as described in further detail in the above referenced Lentz Patent and in U.S. Pat. No. 5,017, 432. In a particularly preferred embodiment, the fluoroelastomer is one having a relatively low quantity of vinylidenefluoride, such as in VITON GF™, available from E.I. Dupont deNemours, Inc. The VITON GF™ has 35 weight percent vinylidenefluoride, 34 weight percent hexafluoropropylene and 29 weight percent tetrafluoroethylene with 2 weight percent cure site monomer. It is generally cured with bisphenol phosphonium salt, or a conventional aliphatic peroxide curing agent.

Preferred examples of the polyorganosiloxane having functionality according to the present invention are of the formula:

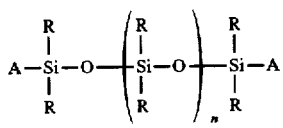

where R independently is an alkyl having for example from 1 to 24 carbon atoms, and preferably from 1 to 12 carbon atoms; alkenyl having for example from 2 to 24 carbon atoms, and preferably from 1 to 12 carbon atoms; or aryl having for example from 6 to 24 carbon atoms, and preferably from 6 to 18 carbon atoms, wherein the aryl group is optionally substituted with an amino, hydroxy, mercapto or an alkyl having for example from 1 to 24 carbon atoms, and preferably from 1 to 12 carbon atoms, or alkenyl group having from 2 to 24 carbon atoms, and preferably from 2 to 12 carbon atoms. In preferred embodiments, R is independently selected from methyl, ethyl, and phenyl. The functional group A may be an alkene or alkyne group having for example from 2 to 8 carbon atoms, preferably from 2 to 4 carbon atoms, optionally substituted with an alkyl having for example from 1 to 24 carbon atoms, and preferably from 1 to 12 carbon atoms, or aryl group having for example from 6 to 24 carbon atoms, and preferably from 6 to 18 carbon atoms. Functional group A can also be mono-, di-, or trialkoxysilane having 1 to 10, preferably 1 to 6, carbon atoms in each alkoxy group, hydroxy, or halogen. Preferred alkoxy groups include methoxy, ethoxy, and the like. Preferred halogens include chlorine, bromine and fluorine. In the above formula, n represents the number of segments and may be for example 2 to 350, and preferably from about 5 to about 100. In the above formula, typical R groups include methyl, ethyl, propyl, octyl, vinyl, allylic crotnyl, phenyl, naphthyl and phenanthryl and typical substituted aryl groups are substituted in the ortho, meta and para positions with lower alkyl groups having less than 15 carbon atoms, and preferably from 1 to 10 carbon atoms. In a preferred embodiment, n is between 60 and 80. Typical alkene and alkenyl functional groups include vinyl, acrylic, crotonic and acetenyl which may typically be substituted with methyl, propyl, butyl, benzyl, and tolyl groups, and the like. The polyorganosiloxane may be present in any effective amount in the grafted elastomer, preferably from about 5 to about 50% by weight, and more preferably from about 10 to about 25% by weight based on the weight of the grafted elastomer. The polyorganosiloxane in the grafted elastomer differs from the formula disclosed herein for the functionally terminated polyorganosiloxane reactant, since the functional ends may have undergone reactions to bond the polyorganosiloxane to the fluoroelastomer.

The dehydrofluorinating agent which attacks the fluoroelastomer generating unsaturation is selected from the group of strong nucleophilic agents such as peroxides, hydrides, bases, oxides, etc. The preferred agents are selected from the group consisting of primary, secondary and tertiary, aliphatic and aromatic amines, where the aliphatic and aromatic groups have from 2 to 15 carbon atoms. It also includes aliphatic and aromatic diamines and triamines having from 2 to 15 carbon atoms where the aromatic groups may be benzene, toluene, naphthalene or anthracene etc. It is generally preferred for the aromatic diamines and triamines that the aromatic group be substituted in the ortho, meta and para positions. Typical substituents include lower alkylamino groups such as ethylamino, propylamino and butylamino with propylamino being preferred. Specific amine dehydrofluorinating agents include N-(2aminoethyl-3-aminopropyl)-trimethoxy silane, 3-(N-strylmethyl-2-aminoethylamino) propyltrimethoxy silane hydrochloride and (aminoethylamino methyl) phenethyltrimethoxy silane.

Other adjuvants and fillers may be incorporated in the elastomer in accordance with the present invention as long as they do not affect the integrity of the fluoroelastomer. Such fillers normally encountered in the compounding of elastomers include coloring agents, reinforcing fillers, crosslinking agents, processing aids, accelerators and polymerization initiators. Following coating of the fluoroelastomer on the substrate, it is subjected to a step curing process at about 38° C. for 2 hours followed by 4 hours at 77° C. and 2 hours at 177° C.

The dehydrofluorinating agent generates double bonds by dehydrofluorination of the fluoroelastomer compound so that when the unsaturated functionally terminated polyorganosiloxane is added with the initiator, the polymerization of the siloxane is initiated. Typical free radical polymerization initiators for this purpose are benzoyl peroxide and azoisobutyronitrile, AIBN.

The substrate for the fuser subsystem component according to the present invention may be of any suitable material. Typically, it takes the form of a cylindrical tube of aluminum, steel or certain plastic materials chosen to maintain rigidity, structural integrity, as well as being capable of having the elastomer coated thereon and adhered firmly thereto. Typically, the fuser members may be made by injection, compression or transfer molding, or they may be extruded. In a typical procedure the core which may be a steel cylinder is degreased with a solvent and cleaned with an abrasive cleaner prior to being primed with a primer such as Dow Corning 1200 which may be sprayed, brushed or dipped followed by air drying under ambient conditions for thirty minutes and then baked at 150° C. for 30 minutes. A silicone elastomer intermediate layer may be applied according to conventional techniques such as injection molding and casting after which it is cured for up to 15 minutes and at 120 to 180 degrees Centigrade to provide a complete cure without a significant post cure operation. This curing operation should be substantially complete to prevent debonding of the silicone elastomer from the core when it is removed from the mold. Thereafter the surface of the silicone elastomer is sanded to remove the mold release agent and it is wiped clean with a solvent such as Isopropyl alcohol to remove all debris.

The outer layer of the fuser member is preferably prepared by dissolving the fluoroelastomer in a typical solvent, such as methyl ethyl ketone, methyl isobutyl ketone and the like, followed by stirring for 15 to 60 minutes at 45°–85° C. after which the polymerization initiator which is generally dissolved in an aromatic solvent, such as toluene is added with continued stirring for 5 to 25 minutes. Subsequently, the polyorganosiloxane is added with stirring for 30 minutes to 10 hours at a temperature of 45°–85° C. A nucleophilic curing agent such as, Viton Curative No. 50, which incorporates an accelerator, (a quarternary phosphonium salt or salts) and a crosslinking agent, bisphenol AF in a single curative system is added in a 3 to 7 percent solution predissolved in the fluoroelastomer compound. Optimally, the basic oxides, MgO and Ca(OH)$_2$ can be added in particulate form to the solution mixture. Providing the layer on the fuser member substrate is most conveniently carried out by spraying, dipping or the like a solution of the homogeneous suspension of the fluoroelastomer and polyorganosiloxane to a level of film of about 12.5 to about 125 micrometers in thickness. This thickness range is selected as providing a layer thin enough to prevent a large thermal barrier for fusing and thick enough to allow a reasonable wear life. While molding, extruding and wrapping techniques are alternative means which may be used, we prefer to spray successive applications of the solvent solution. When the desired thickness of coating is obtained, the coating is cured and thereby bonded to the roll surface. A typical step curing process is heating for two hours at 93° C. followed by 2 hours at 149° C. followed by 2 hours at 177° C. followed by 2 hours at 208° C. and 16 hours at 232° C.

In an alternative procedure, the solvent maybe removed by evaporation by known means, the residue rinsed with a hydrocarbon solvent such as hexane to remove unwanted reactants, if any, and the residue redesolved in the original solvent followed by the addition of Curative No. 50 and the subsequent formation of the outer layer.

The liquid may be any suitable medium which forms an azeotropic mixture with water such as an aliphatic alcohol, an aromatic hydrocarbon, a nitrile, an ether, an acid, or an acetate including combinations of two, three or more liquids as long as such combinations still form azeotropic mixtures with the water. These liquids are mentioned in Sections D-12 for "Binary" and D-24 to D-27 for "Ternary Systems" in the CRC Handbook of Chemistry and Physics, 69th Edition (1988–1989), edited by R.C. Weast, the disclosure of which is totally incorporated by reference. Where combinations of liquids are employed, the various liquids may be employed in any effective proportion ranging for instance from 10:90 to 90:10 by volume for two liquids. Examples of an aliphatic alcohol include those with from about 1 to about 25 carbon atoms, and preferably from 1 to 6 carbon atoms like methanol, ethanol, propanol, butanol, pentanol, trifluoroethanol. Examples of an aromatic hydrocarbon include benzene, toulene, and xylene. Examples of a nitrile include acetonitrile, acrylonitrile, and isobutronitrile. Examples of an ether include ethyl vinyl ether, tetrahydrofuran, and butyl ether. Examples of an acid include acetic acid, propionic acid, and valeric acid. Examples of an acetate include methyl acetate, ethyl acetate, and isopropyl acetate.

The liquid may be present in an amount ranging for example from about 1 to about 20% by weight, preferably from about 2 to about 10% by weight, and more preferably from about 3 to about 5% by weight, based on the weight of the coating composition. The liquid may be added to the coating composition at any time such as during or subsequent to grafting of the polyorganosiloxane to the fluoroelastomer.

Water may be present as for example moisture in an amount ranging for instance from about 1 to about 5% by weight, and especially from about 1 to about 3% by weight, based on weight of the coating composition.

The solvent may be a ketone such as methyl ethyl ketone or methyl isobutyl ketone. The solvent may be present in an amount ranging for example from about 1% to about 60% by weight, preferably from about 5% to about 30%, based on the weight of the coating composition.

The present coating composition exhibits an improved pot life or shelf life. Prior to the present invention, the viscosity of the standard coating composition increased beyond the Xerox viscosity specification of 55 seconds (for spray coating) after only about 8 to 10 days. In contrast, the coating composition containing the azeotrope forming liquid exhibited a relatively stable viscosity which met the Xerox viscosity specification of 55 seconds for a period of time exceeding about 60 days. Based on the Xerox viscosity specification of 55 seconds for spray coating, the minimum shelf life of the present coating composition appears to be at least about 4 months and the maximum shelf life appears to be at least about 7 months.

The examples herein use viscosity cups which are commonly used means for measuring viscosity. The examples employ Gardco cups made by Paul Gardner Company, Inc., Gardner building, 316 N.E. 1st St., Pompano Beach, Fla. 33060. The Gardco cups are simple, rugged and relatively low cost with the accuracy that is adequate for our measurements. The "dip" type is used. The dip type is placed in the test material and as it is withdrawn the time for the material to drain from the cup is determined. The orifice is part of the cup body. There are five types of Gardner EZ Cups: from EZ#1 to EZ#5. They cover the Centistoke range from 7.5 to 1388 in 5% steps. Stoke is one of the fundamental units of viscosity. The Centistoke is Stoke divided by 100. The result of the EZ Cup measurement is obtained as an eflux time in seconds using the stopwatch. The eflux time in seconds ("T") can be converted into the centistokes ("V") using the formula (1), according to the Paul Gardner Company:

$$V = KT - C/T \tag{1}$$

where K and C are constants. For example, the values of the constants for EZ Cup#1 are K=0.875 and C=993; for other Cup#'s the values of the constants are different. For instance for EZ Cup#1: 39.9 seconds translates into 10.0 centistokes, and 61.4 seconds translates into 37.5 centistokes. The examples, however, do not use the conversion formula but report the viscosity results in EZ Cup#1 seconds.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated. The phrase room temperature refers to a temperature of about 25° C.

EXAMPLE 1

The solution was prepared by dissolving 89.4 g of Viton GF pellets in 923 g of methylethyl ketone (MEK) and 213 g of methyl isobutyl ketone (MIBK) by stirring at room temperature. This is accomplished by using a two liter Buchi BEP 280 stirred laboratory autoclave (Type III from "buchiglasuster" distributed in the U.S. and Canada by CTP Corporation, 829 Lincoln Av. Suite 3, Bohemia, N.Y. 11716). The reactor was equipped with a water condenser and with a jacket for heating. The dissolution step was done under 1–2 standard cubic foot per hour (SCFH) of nitrogen purge through the water condenser. The mixing was carried out for 4 to 5 hours at 1100 RPM after which the solution was left in reactor overnight under nitrogen blanket. The following day, 26.8 g of polydimethyl siloxane vinyl terminated (PS441) available from United Chemical Technologies, Inc. followed by 20 milliliters MIBK rinse was added to the above solution at room temperature and the solution heated up to 70° C. under 800 RPM mixing speed. The polydimethyl siloxane vinyl terminated material was added in an excess molar amount relative to Viton GF. Next, 1.77 g of N-2aminoethyl-3-aminopropyltrimethyoxysilane (AO700), available from United Chemical Technologies, Inc. in 20 milliliters of MIBK was added to reactor, followed by 20 milliliters of MIBK rinse. About 5 minutes later, 2.39 g of 98% benzoyl peroxide (BPO) available from Queen City Distributors, in 30 milliliters of MIBK was added to reactor, followed by 20 milliliters of MIBK rinse. This was taken as time zero for the reaction. The stirring was continued for 2 hours at 70° C. During this time the color of solution turned dark yellow which then is cooled down to 50° C. and discharged into a 2-L plastic bottle. Total of 1278.7 g of the solution was recovered from the reactor. The bottle was capped and left to cool down to room temperature. Following this, 423.7 grams of the solution was decanted into a clean 1-L plastic bottle to which 21.3 grams of methanol (4.8% wt) was added and the bottle tightly capped. Bottle was hand shaken for about 5 minutes and left on the shelf. Viscosity of resulting solution as measured by Gardner EZ Cup#1 was found to be very stable with the shelf life as shown in FIG. 1 and the solution viscosity met the Xerox viscosity specification of 55 seconds for spray coating throughout the indicated shelf life.

COMPARATIVE EXAMPLE 1-1

To 425.3 g of solution prepared in Example 1, 21.3 grams of water (4.8% wt) was added in a clean 1-L plastic bottle and the bottle was tightly capped. Bottle was hand shaken for about 5 minutes and placed on the shelf. The following day, when the Gardner EZ Cup measurement was attempted, it was found out that the dark yellow rubber was precipitated to the bottom of the plastic bottle, and the supernatant solution was less viscous than the previous day and of a lighter color. It was concluded that the water caused the rubber to precipitate out of the solution which rendered it unsuitable for utilization.

COMPARATIVE EXAMPLE 1-2

The remaining 429.7 grams of the solution prepared in Example 1 was decanted in a clean 1-L plastic bottle, bottle tightly capped and placed on the shelf. Viscosity of the solution was measured by Gardner EZ Cup#1 and viscosity profile with shelf life is shown in FIG. 1. Already after 10 days of storing the solution, the viscosity had increased to a level which failed to meet the Xerox viscosity specification of 55 seconds for spray coating.

EXAMPLE 2-1

The solution was prepared in the same way as described in the Example 1. Total of 1303.6 grams of the solution was recovered from the reactor. To 429.6 grams of the solution 86 grams (2% wt) of methanol was added in a clean 1-L plastic bottle and bottle was tightly capped. Bottle was hand shaken for about 5 minutes and left on the shelf. Viscosity of resulting solution as measured by Gardner EZ Cup#1 was found to be very stable with the shelf life as shown in FIG. 1 and the solution viscosity met the Xerox viscosity specification of 55 seconds for spray coating throughout the indicated shelf life.

EXAMPLE 2-2

To another 435.3 grams of the solution prepared in Example 2-1, 43.5 grams (9% wt) of methanol was added in a clean 1-L plastic bottle and bottle was tightly capped. Bottle was hand shaken for about 5 minutes and left on the shelf. Viscosity of resulting solution as measured by Gardner EZ Cup#1 was found to be very stable with the shelf life as shown in FIG. 1 and the solution viscosity met the Xerox viscosity specification of 55 seconds for spray coating throughout the indicated shelf life.

COMPARATIVE EXAMPLE 2

The remaining 438.7 grams of the solution prepared in Example 2 was decanted in a clean 1-L plastic bottle and placed on the shelf. Viscosity of the solution was measured by Gardner EZ Cup#1 and viscosity profile with shelf life is shown in FIG. 1. Already after 10 days of shelving the solution, the viscosity had increased to a level which failed to meet the Xerox viscosity specification of 55 seconds for spray coating.

COMPARATIVE EXAMPLE 3

To 475 g of the coating solution, prepared on a larger scale but in a manner similar to the procedures of Example 1, 25 grams of methylethyl ketone (5% wt) was decanted in a clean 1-L plastic bottle and the bottle was tightly capped. Bottle was hand shaken for about 5 minutes and placed on the shelf. Viscosity of the solution was measured by Gardner EZ Cup#1. After 20 days of storage, the viscosity had increased to a level which failed to meet the Xerox viscosity specification of 55 seconds for spray coating. The methylethyl ketone is not believed to form an azeotropic mixture with any water in the coating solution.

Other modifications of the present invention may occur to those skilled in the art based upon a reading of the present disclosure and these modifications are intended to be included within the scope of the present invention.

We claim:

1. A coating composition comprising water, a solvent, a grafted elastomer composed of a polyorganosiloxane bonded to a fluoroelastomer, and a liquid which forms an azeotropic mixture with the water, wherein the azeotropic mixture of the water and the liquid restrains a viscosity increase in the coating composition over time, wherein the liquid is present in an amount ranging from about 2 to about 10% by weight based on the weight of the coating composition, wherein the grafted elastomer is prepared by a process including adding unsaturated polyorganosiloxane in an excess molar amount relative to the fluoroelastomer.

2. The coating composition of claim 1, wherein the liquid is present in an amount ranging from about 3 to about 5% by weight based on the weight of the coating composition.

3. The coating composition of claim 1, wherein the liquid is an aliphatic alcohol.

4. The coating composition of claim 1, wherein the liquid is methanol.

5. The coating composition of claim 1, wherein the liquid is selected from the group consisting of an aromatic hydrocarbon, a nitrile, an ether, an acid, and an acetate.

6. The coating composition of claim 1, wherein the solvent is a ketone.

7. The coating composition of claim 1, wherein the fluoroelastomer is selected from a group consisting of poly (vinylidene fluoride-hexafluoropropylene) and poly (vinylidene fluoride-hexafluoropropylene-tetrafluoroethylene).

8. The coating composition of claim 1, wherein the unsaturated polyorganosiloxane is:

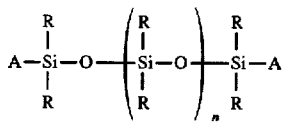

where R independently Is an alkyl, alkenyl or aryl, wherein the aryl is optionally substituted with an amino, hydroxy, mercapto or alkyl or alkenyl group; the functional group A is an alkene or alkyne wherein the alkene and alkyne of the functional group A are optionally substituted with an alkyl or aryl; and n represents the number of segments.

9. The coating composition of claim 1, wherein the grafted elastomer is a substantially uniform integral interpenetrating network of a hybrid composition of the fluoroelastomer and the polyorganosiloxane, the grafted elastomer having been formed by dehydrofluorination of the fluoroelastomer by a nucleophilic dehydrofluorinating agent, followed by addition polymerization of the polyorganosiloxane having an alkene or alkyne functionally terminated end.

10. A method for restraining a viscosity increase in a water containing coating composition comprising adding to the water containing coating composition a liquid which forms an azeotropic mixture with the water, thereby restraining a viscosity increase in the composition over time, wherein the coating composition comprises the azeotropic mixture of the liquid and the water, a solvent, and a grafted elastomer composed of a polyorganosiloxane bonded to a fluoroelastomer, wherein the liquid is present in an amount ranging from about 2 to about 10% by weight based on the weight of the coating composition, wherein the grafted elastomer is prepared by process including adding unsaturated polyorganosiloxane in an excess molar amount relative to the fluoroelastomer.

11. The method of claim 10, wherein the liquid is present in an amount ranging from about 2 to about 10% by weight based on the weight of the coating composition.

12. The method of claim 10, wherein the liquid is an aliphatic alcohol.

* * * * *